Nov. 30, 1948.  R. R. HAYS  2,455,006

COUNTER-TORQUE MECHANISM FOR HELICOPTERS

Filed July 31, 1945  2 Sheets-Sheet 1

Inventor
Russell R. Hays,
By
Attorney

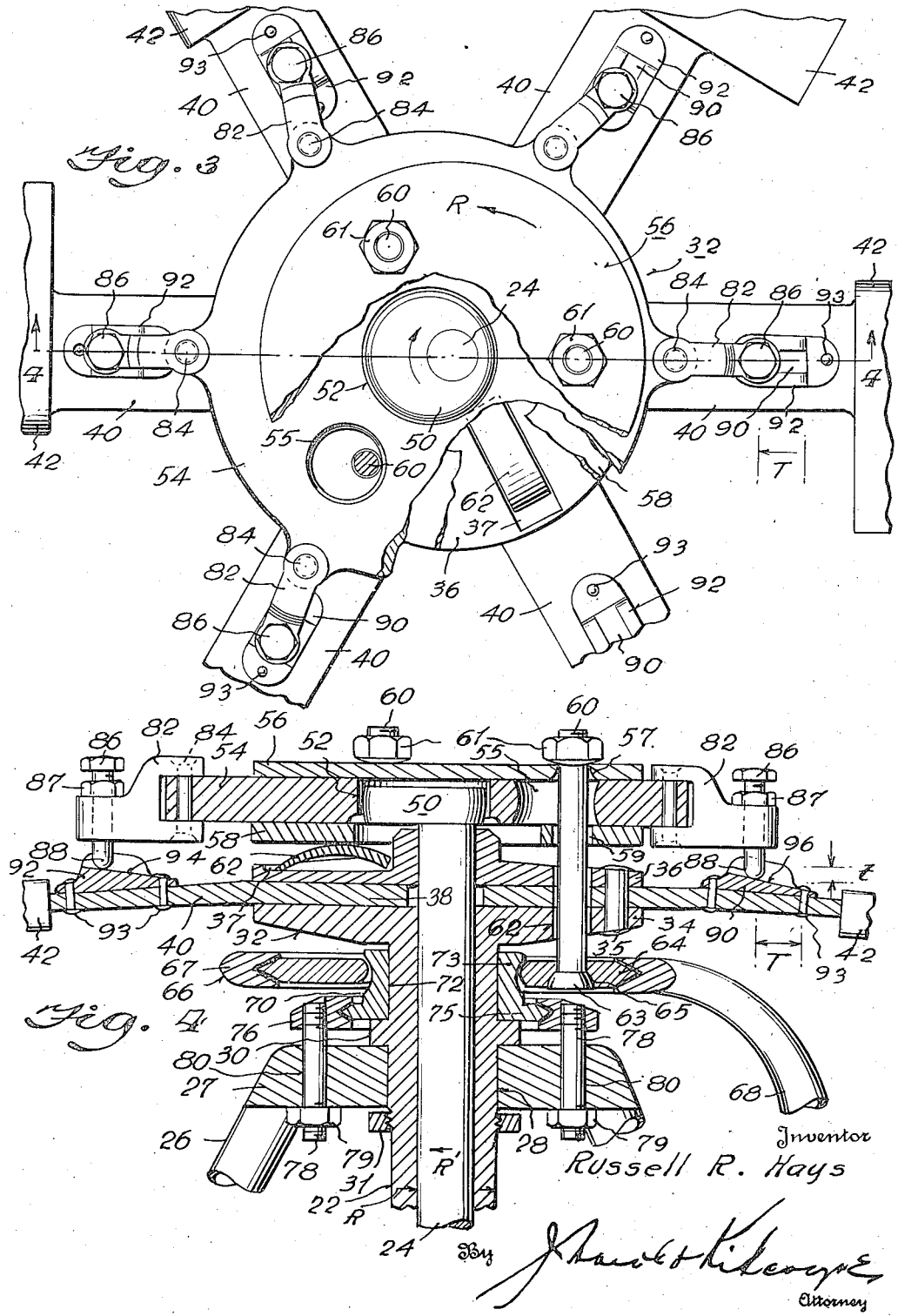

Patented Nov. 30, 1948

2,455,006

UNITED STATES PATENT OFFICE 2,455,006

COUNTERTORQUE MECHANISM FOR HELICOPTERS

Russell R. Hays, Lawrence, Kans.

Application July 31, 1945, Serial No. 607,961

11 Claims. (Cl. 244—17)

This invention relates to improvements in a counter-torque mechanism for use with helicopters having a single lifting rotor.

In testing various types of torque plates and eccentrics for inducing wobbling of a universally mounted lifting rotor to obtain a counter-torque equal and opposite to the rotor torque, it became evident that vibration and pitching moments created by unbalanced aerodynamic forces effective on the rotor as a result of this wobbling gave rise to certain objections requiring further consideration in achieving practical full scale flight. Although inter-related, it was found that such vibration resulted primarily through lag of the blades when being accelerated transversely to their normal plane of rotation by the action of the torque plate, and that pitching moments were due to forces induced by the counter-torque plate, and those arising through canting of the lift line of the rotor, not being equal and opposite in sign.

To overcome these objectionable features two basic changes in the arrangement of the blades were made. The first of these was to use two identical rotors, both universally mounted on a common hub and hence turning in the same direction. A wedge mounted on the counter-torque shaft passed between plates carried by these rotors so that it successively raised the blades of one and at the same time depressed the blades of the other. This change of blade arrangement took care of the unbalanced lift-torque forces and helped the vibration but did not entirely eliminate it, investgiation revealing that the blades of the rotor being raised were traveling higher from their initial plane of rotation than were those being depressed. This then lead to the decision to aerodynamically load the blades so that an increased airload as well as an inertia load opposed their transverse travel in response to the wobbling induced by the torque plate.

Since aerodynamic loading of the blades called for relative feathering action during different phases of rotation, and since feathering of the blades would introduce increased mechanical complexity in the design of a hub for universally mounted rotors, use of the latter type of rotor mounting was discontinued and instead the blades were individually and articulatively secured to the hub. Hence, since the pitch of the blades was constant with respect to the hub, raising them tended to decrease their attack angle and depressing them tended to increase it, and this action was further increased by the counter-precessional wobbling of the blades by the counter-torque plate. As it logically follows that the counter-torque load should be utilized to depress rather than raise the blades, the current design evolved, and among its objects may be noted the following:

1. The provision of a counter-torque mechanism for a lifting propeller by which different blades are successively transversely accelerated at opposite phases of rotation to simultaneously create torque and lift forces of equal and opposite sign.

2. The provision of a counter-torque mechanism of the character described, in which the blades are individually and articulatively mounted on the rotor hub in such a fashion that they are aerodynamically loaded during their downward acceleration.

3. The provision of a mechanism of the character described, in which simultaneously downward acceleration of opposite and different blades is achieved by a single simple eccentric mounted in the hub structure.

4. The provision of manually controlled means in a mechanism of the stated character for differentially varying the degree of transverse acceleration of opposite blades to provide cyclic control.

5. The provision of manually controlled means in such a mechanism for releasing and putting into operation by varying degrees the counter-torque mechanism.

6. The provision of a rotor for use with a mechanism of the type described in which means are incorporated for uniformly accelerating the blades during the downward phase of their transverse oscillation.

7. The provision of resilient means intermediate the blades of such a rotor and the hub upon which they are mounted for damping shock loads arising through operation of the counter-torque mechanism.

The above and ancillary objects such as compact arrangement of the elements essential to attaining these ends will be apparent from the following description taken in conjunction with the accompanying drawings in which:

Fig. 3 is an enlarged plan view looking down on the hub of the rotor shown in Fig. 1, with parts cut away to show the operation of the main wobble plate or eccentric; and Fig. 4 is a somewhat diagrammatic sectional view of the hub or rotor head taken along the line 4—4 of Fig. 3 showing a typical arrangement of the control plates and of the mounting of the head in the supporting pylon.

Figure 1:
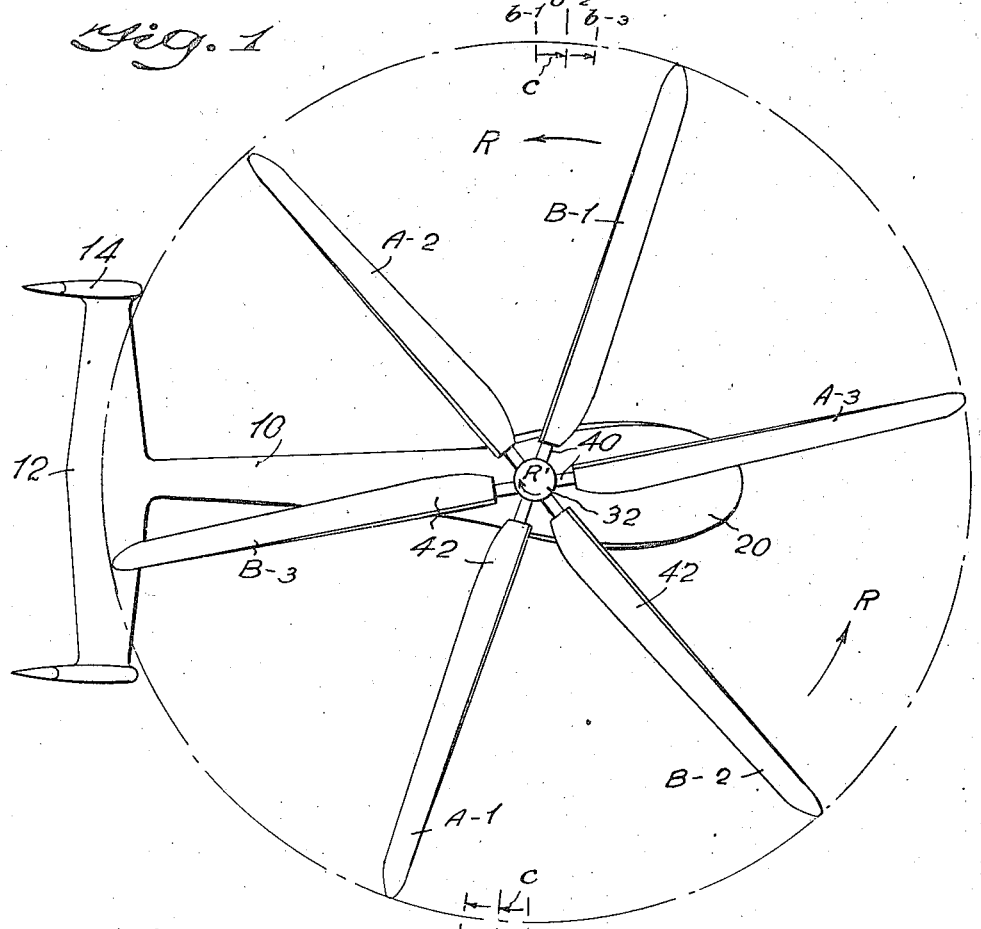
Fig. 1 is a plan view of a heliocopter having a lifting propeller or rotor mounted for wobbling by means of a torque plate according to the invention.

Referring to the drawings, a helicopter fuselage 10 (Figs. 1 and 2) of conventional design has a horizontal stabilizer 12 at its trailing end on which are mounted vertical stabilizers and anti-torque surfaces 14 and 16, a landing gear 18, and a pilot's compartment 20 in its nose. An engine (not shown) is centrally disposed in the fuselage and drives conventional reduction gearing which in turn drives vertically disposed co-axial shafts 22 and 24 (Fig. 4) through a differential which may be and preferably is of the type disclosed in my co-pending application, Serial No. 496,917, filed July 31, 1943, now Patent No. 2,402,043, to provide equal driving torques for these shafts. A pylon 26 disposed above the fuselage has a head 27 providing a bearing 28 in which the outer drive shaft 22 is journaled and maintained by flange 30 and lock nut 31.

A rotor head or hub structure 32 carried above the pylon 26 by drive shaft 22 includes a flange 34 at the upper end of shaft 22 and a matching plate 36 spaced upwardly therefrom, a spring steel plate 38 being fixedly secured between flange 34 and plate 36 by means of symmetrically disposed rivets 35. The spring steel plate 38 extends outwardly of flange 34 as symmetrically disposed transversely flexible strips 40 (Fig. 3) on which the rotor blades 42 are mounted, the attachment of the blades to the rotor hub being similar to that disclosed in my co-pending application Serial No. 573,661, filed January 20, 1945, in that the spring members 40 constitute resilient as well as yieldable members providing the equivalent of a conventional hinge mounting for rotor blades.

A wobble plate assembly fixed on top of the rotor hub structure 32 is associated with an eccentric plate or cam 50 preferably comprising an extension of driving shaft 24, which latter passes through the rotor head plates 34 and 36 as shown, the latter of which serves as a bearing to maintain said shaft in alignment with the co-axial rotor shaft 22. Cam 50 is freely contained within a bearing 52 centrally located in a wobble plate 54 retained between a top plate 56 and a washer 58, both being maintained in axial alignment with driving shaft 24 by symmetrically disposed bolts 60 mounted for limited longitudinal travel through holes 62 in the rotor head plates 34, 36, and 38. Oversized holes 55 in the wobble plate 54 permit freedom of radial (orbital) movement of the latter about bolts 60 within the limits of the throw or eccentricity T of cam 50, the holes 57 and 59 in plate 56 and washer 58, respectively, through which the bolts 60 pass being reamed and the face of cam 50 being curved to permit a small degree of tilting of wobble plate 54 with respect to the rotor head structure 32 in response to differential travel of retaining bolts 60.

Figure 2:
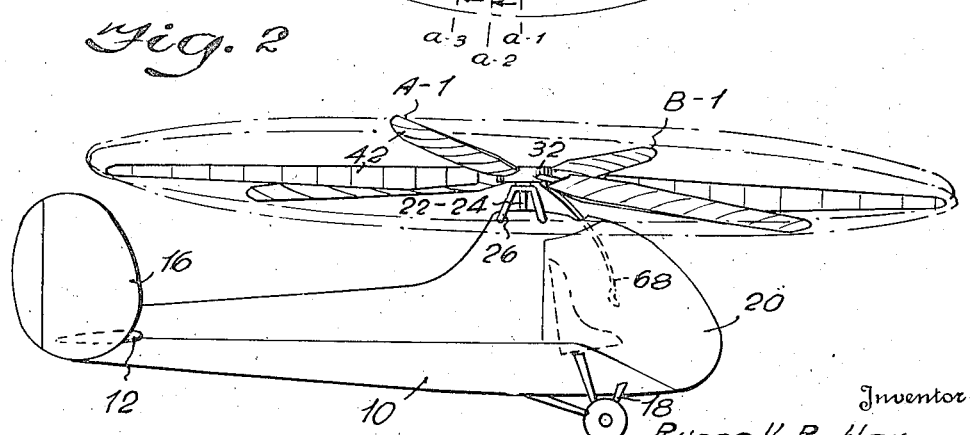
Fig. 2 is a side elevational view of the same machine illustrating the opposed wobbling induced in opposite blades.

Symmetrically disposed leaf springs 62 reactive between the washer 58 and the rotor head structure 32 are retained in wells 37 of head plate 36 and normally urge the wobble plate assembly upwardly away from the rotor head 32, such movement being restrained by nuts 61 screwed onto bolts 60. Longitudinal travel of bolts 60 is in turn restrained by bolt heads 63 carried in holes 65 of the central disc 64 of a swash plate 66 having outer ring 67 to which is fixed a control lever 68, extending into the pilots compartment 20 (Fig. 2). Swash plate 66 is loosely retained on a collar 70 disposed about and mounted for limited longitudinal travel on portion 72 of the driving shaft 22 by a collar flange 73, against which the swash plate is normally urged through tension of the springs 62 as transmitted by bolts 60, so that pressure applied to the swash plate handle 68 produces differential travel of bolts 60 and a corresponding tilting of wobble plate 54 with differential compression of springs 62.

The lower end of the sliding collar 70 is flanged and edge-beveled to form the inner race 75 of a pressure bearing 76 carrying bolts 78 mounted for longitudinal travel in holes 80 of pylon head 27 and carrying adjustment nuts 79 on their lower ends by means of which sliding collar 70 may be relatively raised or lowered with respect to the rotor head structure 32 to produce a corresponding raising and lowering of the wobble plate assembly against the tension of compression springs 62.

Conversion of the radially eccentric motion of the wobble plate 54 in response to turning of the rotor head 32, while the cam 50 remains relatively fixed, to transverse motion periodically urging blades 42 transversely to their mean plane of rotation is achieved through symmetrically disposed push links 82, one for each blade, the links being pivotally fixed to the wobble plate 54 adjacent its perimeter by means of vertical pivot pins 84. The outer ends of push links 82 carry vertically disposed push bolts 86 which are vertically adjustable through lock nuts 87. The lower ends of the push bolts are rounded as shown and are adapted to travel in the canted, radially disposed slots 90 of push plates 92, one such push plate being fixed by rivets 93 to the upper faces of each of the blade mounting strips 40 (Fig. 3). The center lines of the canted slots 90 lie in vertical planes containing the centers of pressure of the rotor blades 42, and the canted and slightly curved bottoms or operating faces of the slots being symmetrically disposed with respect to the rotor head 32.

According to an important feature of the invention, the push plates 92 have operating faces of opposite vertical cant on alternate, and in this instance opposed, rotor blades. (See opposite canting of faces 94, 96, Fig. 4.) Because of this opposite canting of alternate push plate faces 94 and 96, the throw T of the wobble plate 54 is effectively converted to a vertical force acting through a distance $t$ against these faces to simultaneously depress the rotor blades by pairs. This is a simple cam action resulting directly in response to relative turning movement between co-axial driving shafts 22 and 24. Thus, if anti-torque shaft 24 be locked and the rotor driving shaft 22 be rotated, the action is one of depressing each blade 42 a distance $t$ during each complete rotation of the shaft. However, instead of depressing all six blades successively, as heretofore, opposite canting of the push plate faces 94 and 96 causes them to be depressed successively in pairs, and since the depressing force acting through the distance $t$ is effective upon three of the blades at phases of rotation 180° from the other three, the tilting of the blades 42 induced by this force causes one group of three alternate blades to tilt in one direction, and the other group to tilt oppositely and equally. This grouping of the blades is illustrated in Fig. 1 by the blade designations A—1, A—2, A—3 and B—1, B—2, B—3 so that they may be considered as separate rotors mounted on a common hub and tilting at opposite phases of rotation in response to the action of the counter-torque plate 54.

In operation, the wobbling of the effectively individual rotors A and B to produce a counter-torque force arresting turning of the driving shaft 24 is essentially the same as that described in my application, Serial No. 505,527, now Patent No. 2,388,653. In starting, drive shaft 24 is initially held from turning by a conventional brake, and the rotor revved up. Torque plate adjustment nuts 79 are then tightened until bolt faces 88 contact push plate faces 94 and 96. Such results in the application of a transverse force through a distance t on the push plate faces, and rotor A tilts in one direction and rotor B in the other as periodic flapping of the blades is thus induced. Very little energy is required to maintain this flapping or tilting since the natural transverse frequency of the blades is substantially that of the rotors' R. P. M., the energy required to depress the blades 42 and tension members 40 on the downstroke being returned on the upstroke through the medium of the blades' inertia.

If the shaft 24 now be released, turning of the cam 50 counter-rotationally to the rotor head 32 is resisted by the necessity for accelerating the transverse oscillation or flapping of the blades 42 through the medium of push bolt faces 88, said acceleration being directly resisted by the inertia of the blades in a fashion analogous to counter-precessional movement of a gyroscope. Thus while the energy of the rotor driving shaft 22 is expended in turning the rotor, the energy of the counter-torque shaft is expended in the effort to increase the transverse frequency of a dynamic system, the natural frequency of which is predetermined by its rate of rotation. The extent to which the counter-torque cam 50 is effective in so doing is illustrated in Fig. 1 by the counter-rotational wobbling of rotors A and B. Hence, when the high point of tilting of the rotor blade A—1 occurs in azimuth at the point $a$—1, the following blade A—2 in response to acceleration through the wobble plate 54 reaches its highest travel at the point $a$—2, a distance C behind $a$—1; the blade A—3 counter-precesses a similar distance to the point $a$—3, and so successively the high point of tilting of rotor A travels counter-rotationally around the perimeter of the rotor disc, giving rise to what has been described as wobbling of the rotor.

Simultaneously with the travel of the high point of tilting of rotor A, the high point of tilting of rotor B at the opposite side of the rotor disc moves in the same direction and at the same rate, energy required to negate the torque of driving shaft 24 in this fashion being represented roughly by the ratio of the R. P. M. of shaft 24 to the R. P. M. of shaft 22. As a matter of fact, the R. P. M. of shaft 22 decreases slightly with release of shaft 24. At the same time, however, the attack angle of the depressed or down-beating blade is increased, through its transverse acceleration, as is the attack angle of the rising blade by reason of its relative transverse deceleration; so that the over all effect of counter-rotational wobbling is also one of attack angle increase. These considerations make the functioning of the torque plate difficult to evaluate, but there are indications that for hovering flight mechanical losses are more than offset by increased aerodynamic efficiency.

Until the present time the chief problem has been one of balancing lift and torque forces to provide a stable system. By opposite tilting of rotors A and B, it is self-evident that horizontal components of thrust and torque neutralize each other, and that the energy utilized in successively accelerating paired blades during the down stroke takes the form of increased lift directly opposed to the weight of the helicopter. The pertinent factor in the creation of vibration through depression of the blades is thus seen to be largely dependent upon the length of time required to accelerate an individual blade. If the acceleration be produced by impact it may occur within a brief phase of the blade's transverse period. High shock loads observable as vibration are imposed by this condition. If, however, the acceleration be gradually imparted to the blade during the major portion of its downbeat, then with three-bladed rotors the accelerating phases over-lap and uniform travel of cam 50 without vibration results.

It will be observed that in the instant invention three different methods are used for increasing the accelerating phase. The first of these in which the aerodynamic loading of the blade is increased by causing it to feather, has already been discussed. The second is concerned with a slight yield of the blade butt under the initial counter-torque load by reason of resilience in the spring steel member 40, which thus acts to damp overloads and transmit them gradually to the blade. The third involves the use of push plate faces 94 and 96 which have a slightly vertical curvature rather than being flat, with the result that the rate of depression of the blade takes into account the acceleration attained during the upper portion of the downbeat. In brief, the slope of the push plate faces 94 and 96 is slightly steeper at the higher end.

To obtain cyclic control of the rotor it is only necessary to tilt the counter-torque plate 54 very slightly with respect to the rotor head 32, since by doing so the relatively small travel $t$ of the push plates 92 is differentially varied at opposite phases of rotation, with the result that the tilt of rotors A and B is alternately varied during passage through these phases. This differential tilting of rotors A and B gives rise to an unbalanced horizontal component of their mean lift and hence to a pitching moment effective between 45° and 90° later in azimuth from the direction of tilting of swash plate 66 by control handle 68. In other respects, operation of the control by swash plate 66 working through symmetrically disposed bolts 60, follows that of ordinary cyclic controls now in use on helicopters.

Having described one specific embodiment of my invention, together with the operation thereof, I desire it to be understood that the form thereof which has been illustrated was selected primarily for the purpose of facilitating disclosure, rather than to limit the number of forms which the invention may assume. It is to be moreover understood that various modifications, adaptations and alterations may be applied in and to the specific mechanism shown as may be necessary to meet the requirements of practice without in any manner departing from the spirit and scope of the invention as set forth in the appended claims.

I claim:

1. In a counter-torque mechanism, a lifting propeller, and means for successively, transversely depressing different blades of said propeller at opposite phases of rotation to simultaneously create torque and lift forces of equal and opposite sign.

2. In a counter-torque mechanism for a lifting propeller, means for successively, transversely depressing different blades of said propeller at opposite phases of rotation to simultaneouly create torque and lift forces of equal and opposite sign, and means for mounting said blades to resist said depressing means by relatively increasing the aerodynamic loading of said blades in response to said transverse depression.

3. In a counter-torque mechanism, a lifting propeller, and differential means for successively, transversely depressing different blades of said propeller at opposite phases of rotation to simultaneously create unequal torque and lift forces at a predetermined position in azimuth whereby pitching moments are made available for the control of the machine upon which said propeller is mounted.

4. In a counter-torque mechanism for a lifting propeller, means for successively, transversely depressing different blades of said propeller at opposite phases of rotation to simultaneously create torque and lift forces of equal and opposite sign, and manually controlled means for varying the degree of said transverse depression of said blades.

5. In a counter-torque mechanism, a lifting propeller, and means for uniformly, successively, transversely depressing different blades of said propeller at opposite phases of rotation to simultaneously create torque and lift forces of equal and opposite sign.

6. In a counter-torque mechanism for a lifting propeller, means for uniformly, successively, transversely depressing different blades of said propeller at opposite phases of rotation to simultaneously create torque and lift forces of equal and opposite sign, and means operative to cause said depressing means to vary its velocity at the same rate as the transverse depression imparted to said blades.

7. In a counter-torque mechanism for a lifting propeller, means for successively, transversely depressing different blades of said propeller at opposite phases of rotation to simultaneously create torque and lift forces of equal and opposite sign, said means including resilient means intermediate said blades and the hub upon which they are mounted whereby shock loads imposed during transverse depression of said blades are damped.

8. In a counter-torque mechanism for helicopters having a rotor, comprising the combination of coaxial shafts, one of said shafts carrying a hub, symmetrically disposed rotor blades articulatively mounted on said hub, cooperating means on the other of said shafts and said hub including an eccentric cam mounted in said hub and operatively associated with said rotor blades to periodically induce acceleration thereof transversely to their normal plane of rotation.

9. In a counter-torque mechanism for helicopters having a rotor, comprising the combination of coaxial shafts, one of said shafts carrying a hub, symmetrically disposed rotor blades articulatively mounted on said hub, cooperating means on the other of said shafts and said hub including an eccentric mounted in said hub and operatively associated with said rotor blades to periodically induce transverse downward acceleration of opposite blades to cause relatively opposite tilting thereof.

10. In a counter-torque mechanism for helicopters having a rotor comprising the combination of coaxial shafts, one of said shafts carrying a hub, symmetrically disposed rotor blades articulatively mounted on said hub, cooperating means on the other of said shafts and said hub including an eccentric mounted in said hub and operatively associated with said rotor blades to periodically induce transverse downward acceleration of opposite blades to cause relatively opposite tilting thereof, and differential means including a swash plate and a control lever mounted on said hub for differentially varying the degree of tilting of said blades to produce control moments in said helicopter.

11. In a counter-torque mechanism for helicopters having a rotor, comprising the combination of coaxial shafts, one of said shafts carrying a hub, symmetrically disposed rotor blades articulatively mounted on said hub, cooperating means on the other of said shafts and said hub including an eccentric mounted in said hub and operatively associated with said rotor blades to periodically induce transverse downward acceleration of opposite blades to cause relatively opposite tilting thereof, and means for causing counter-rotational travel of the high point of tilting of said oppositely tilted blades.

RUSSELL R. HAYS.

REFERENCES CITED

The following references are of record in the file of this patent:

UNITED STATES PATENTS

| Number | Name | Date |
|---|---|---|
| 2,388,653 | Hays | Nov. 6, 1945 |

OTHER REFERENCES

"Aeronautical Engineering Digest," July 1944, pages 31, 32, 183.